United States Patent [19]

Kamada et al.

[11] Patent Number: 5,216,399
[45] Date of Patent: Jun. 1, 1993

[54] AUTOMATIC CANCELLING DEVICE FOR BLINKERS

[75] Inventors: Soetsu Kamada; Makoto Matsubara, both of Furukawa, Japan

[73] Assignee: Alps Electric Co., Ltd., Tokyo, Japan

[21] Appl. No.: 691,575

[22] Filed: Apr. 25, 1991

[30] Foreign Application Priority Data

Jun. 19, 1990 [JP] Japan .................. 2-63969[U]

[51] Int. Cl.⁵ ........................................... H01H 3/00
[52] U.S. Cl. ............................. 335/190; 200/61.27; 200/61.3
[58] Field of Search ............... 200/61.27–61.38; 335/186, 187, 189, 190

[56] References Cited

U.S. PATENT DOCUMENTS

| | | | |
|---|---|---|---|
| 4,097,700 | 6/1978 | Okazaki | 200/61.27 |
| 4,801,770 | 1/1989 | Yukitomo et al. | 200/61.27 |
| 4,855,542 | 8/1989 | Furuhashi et al. | 200/61.27 |
| 4,902,860 | 2/1990 | Maeda | 200/61.27 |
| 4,939,540 | 7/1990 | Kamada et al. | 335/190 |
| 5,068,633 | 11/1991 | Maeda | 335/190 |

Primary Examiner—J. R. Scott
Attorney, Agent, or Firm—Guy W. Shoup; David W. Heid; Patrick T. Bever

[57] ABSTRACT

An automatic cancelling device for electric-type blinkers comprises: a case; a blinker operation lever pivotably connected to the case about an axis; an engagement rod slidably disposed on the blinker operation lever and biased in a direction away from the axis by a compression spring; a lane-change cam rigidly connected to the case and positioned to contact the engagement rod, the lane-change cam having an stepped portion for creating a clicking feeling at a right and a left position to which the blinker operation lever swings; a locking protrusion provided on the blinker operation lever; a locking member adapted to engage the locking protrusion so as to lock the blinker operation lever at its right or left position and capable of moving toward and away from the locking protrusion; and a locking-member driving member which moves the locking member so as to effect engagement and disengagement between the locking member and the locking protrusion. The detention cam and the locking members are formed as separate members, with the displacement of the locking member, effected by the locking-member driving member, being made relatively small.

1 Claim, 13 Drawing Sheets

AUTOMATIC CANCELLING DEVICE FOR BLINKERS

BACKGROUND OF THE INVENTION

1. Field of the Invention

This invention relates to an automatic cancelling device for blinkers and, in particular, to an automatic cancelling device for electric-type blinkers which is adapted to disengage from a locked position by the attraction of a solenoid even when the blinker operation knob is at a position away from the steering shaft.

2. Description of the Related Art

Generally, an automatic cancelling device for electric type blinkers of the above-mentioned type has a blinker operation lever which is rotated by a blinker operation knob and which is swingably arranged in a case. A driving rod is swingably held by this lever through the intermediation of a compression spring. This driving rod is pressed against an opposite cam, or the cam is pressed against this driving rod by the spring. This cam is equipped with two locking grooves serving to retain the above-mentioned lever at either of two positions respectively corresponding to the right/left blinker switching contacts for causing either the right or the left blinker to flash and a groove situated between these two grooves and serving to retain the lever at its neutral position. The lever can be returned to its neutral position from its left or right position where it has been retained, i.e., from either of its lock positions, by means of a solenoid. This solenoid is adapted to be energized by an unlocking signal and causes the cam to retreat, thereby cancelling the locking and allowing the lever to return to its neutral position. Further, when swinging the lever to its left or right position, the driving rod moves over a step section immediately before it fits into the locking groove, with the result that the operator experiences a clicking feeling when effecting the locking.

In the prior-art structure described above, the driving rod and the cam are pressed against each other, for example, by the resilient force of a compression spring so that the blinker operation lever may be retained or locked in its right, left or neutral position without involving any play. Further, the blinker operation lever is biased toward its neutral position by a return spring so that it may automatically return to its neutral position. Because of the force of this return spring acting on the blinker operation lever, the force of the above-mentioned compression spring is set larger than the force of the return spring so that the locked condition may be maintained. Accordingly, when cancelling the locked condition, the cam has to be moved against the resilient force of the compression spring. This movement requires a large-sized solenoid, making it difficult to reduce the device size and resulting in high production costs.

Further, in this cam, the raised portions of the cam surface in which are formed grooves which are used for locking and unlocking the blinker operation lever (the grooves for locking the lever in its right or left position) and the raised portions of the cam used for resisting the rotation of the blinker operation lever (the raised surfaces positioned immediately before the grooves for locking) are integrally formed, so that the configuration of these highs has an influence on the unlocking operation. Thus, the displacement of the cam effected by the solenoid must be large, which means the solenoid used must be a large-sized one. In addition, the configuration of the cam highs for detention is limited to certain types, so that the operator cannot experience a varied feeling in operation.

SUMMARY OF THE INVENTION

This invention has been made with a view to alleviating the above-mentioned problems in the prior-art structure described above. It is accordingly an object of this invention to provide an automatic cancelling device for blinkers which requires a relatively small driving force for effecting unlocking so as to reduce the size of and the production cost of the driving member and which enables the operator to experience a varied feeling in operation.

In order to achieve the above object, the present invention provides an automatic cancelling device for blinkers, comprising: a blinker operation lever pivotably connected to the case about an axis; an engagement rod slidably disposed on the blinker operation lever and biased in a direction away from the axis by a compression spring; a lane-change cam rigidly connected to the case and positioned to contact the engagement rod, the lane-change cam having an stepped portion for creating a clicking feeling at a right and a left position to which the blinker operation lever swings; a locking protrusion provided on the blinker operation lever; a locking member adapted to engage the locking protrusion so as to lock the blinker operation lever at its right or left position and capable of moving toward and away from the locking protrusion; and a locking-member driving member which moves the locking member so as to effect engagement and disengagement between the locking member and the locking protrusion.

In the structure described above, the lane-change cam and the locking member are formed as separate members, so that the locking member can be moved by the locking-member driving member irrespective of the resilient spring force acting on the lane-change cam. Accordingly, the requisite driving force for this movement can be relatively small.

Further, the displacement of the locking member can be made small without consideration for on the configuration of the lane-change cam. Further, since more freedom is available with respect to the configuration of the lane-change cam, the operator can experience a varied feeling in operation.

BRIEF DESCRIPTION OF THE DRAWINGS

The accompanying drawings illustrate an embodiment of this invention, in which.

DESCRIPTION OF THE PREFERRED EMBODIMENT

An embodiment of this invention will now be described with reference to the accompanying drawings. The term "blinkers" is used to describe switch mechanisms, and in particular automobile turn-signal switch mechanisms.

In these drawings, the reference numeral 1 indicates a cover, and the reference numeral 2 indicates a case. The cover 1 and the case 2 are attached to each other by snapping engagement of protrusions 2a of the case 2 into engagement holes 1a of the cover 1, thereby forming a box-like housing including a lodging section 3, in which blinker operation lever 4 is swingably (pivotably) disposed. Protruding from one end surface of this blinker operation lever 4 is a swinging axle 4a, and formed in the other end surface of the lever 4 are arc-like fitting recesses 4b, into which a cylindrical swinging axle 5 fits. These fitting recesses 4b are respectively arranged on the side edges of a through-hole 4c for lodging a passing lever, which is described below. The swinging axle 4a and the cylindrical swinging axle 5 are respectively fitted into bearing holes 2b and 1b formed in the case 2 and the cover 1, respectively, thereby supporting the blinker operation lever 4. Provided in one free end section of this blinker operation lever 4 is a holder section 6 consisting of a rectangular hole, into which a driving rod 8 (first cam follower) is inserted with a compression spring 7 being located between the driving rod 8 and the holder section 6. A stopper projection 8a protrudes from one side surface of this driving rod 8, and cutouts 6a are formed along one of the side walls of the holder section so as to form a resilient member 6b, which has an elongated hole 6c for receiving the above-mentioned stopper projection 8a. The forward end section of this driving rod 8 is pressed by the compression spring 7 against a lane-change cam 9 (first cam surface) formed on the inner surface of the case.

Figure 8A:
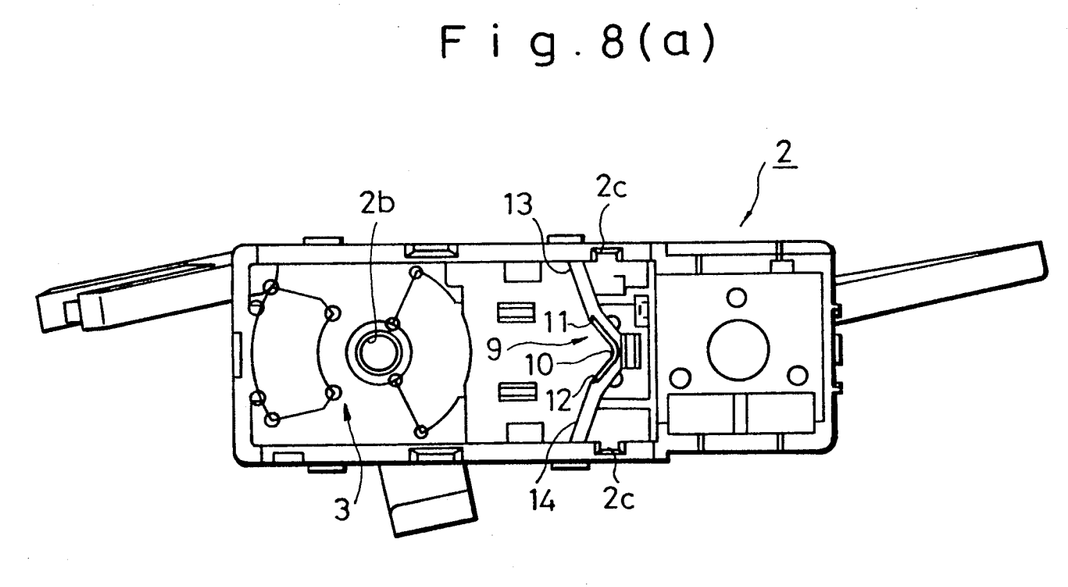
FIGS. 8(a), 8(b) and 8(c) are a plan view, a bottom view, and a longitudinal sectional view, respectively, of the case of this device.
Figure 8B:
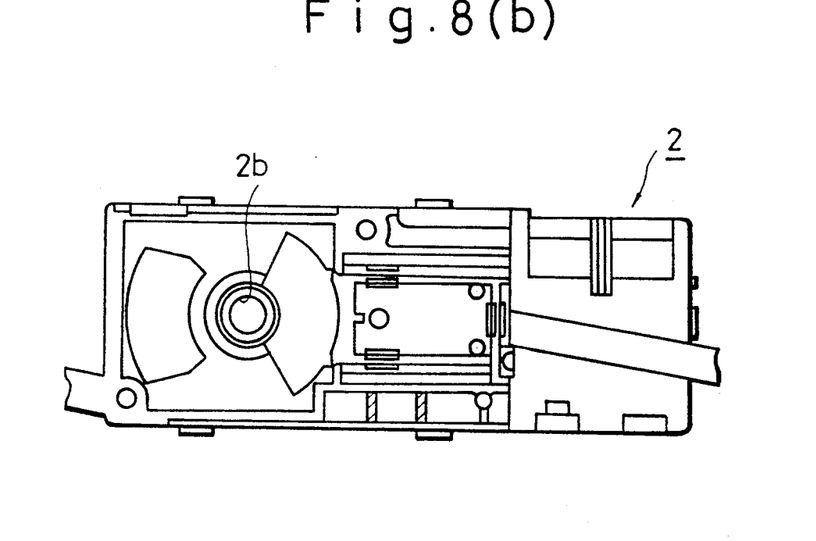
Figure 8C:
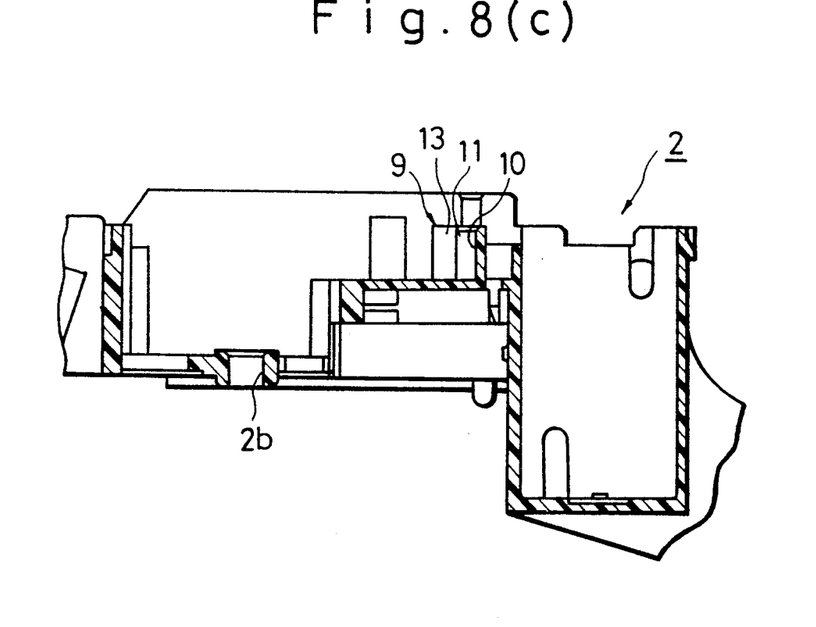
Figure 9A:
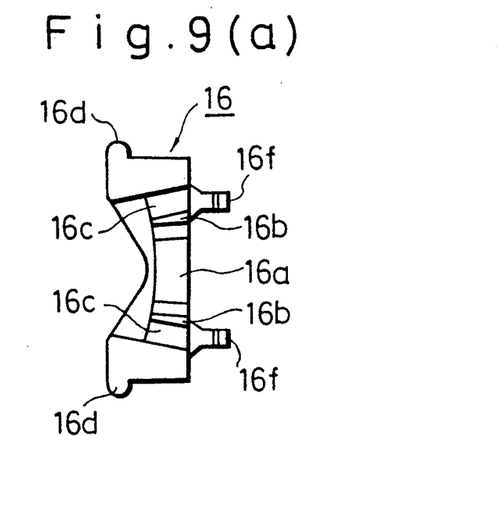
FIGS. 9(a), 9(b), 9(c), 9(d) and 9(e) are a front view, a right-hand side view, a bottom view, a left-hand side view, and a rear view, respectively, of the locking member.
Figure 9B:
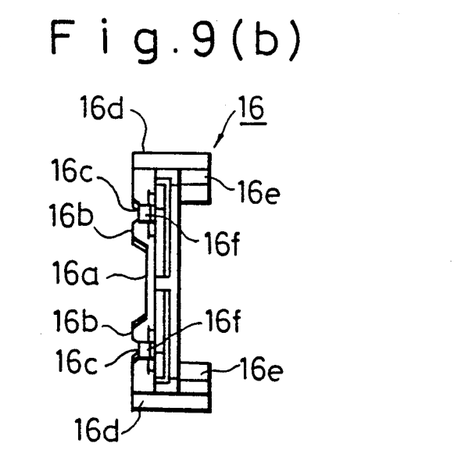
Figure 9C:
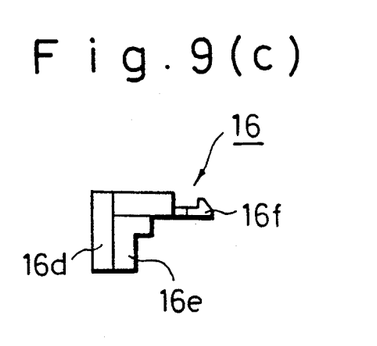
Figure 9D:
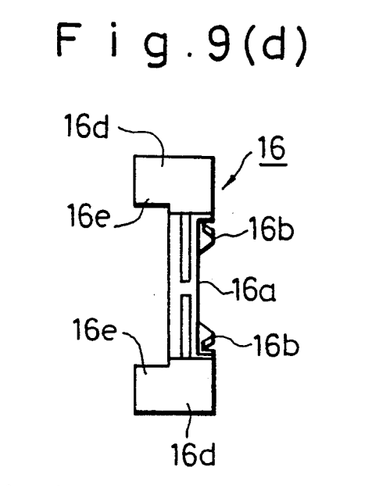
Figure 9E:
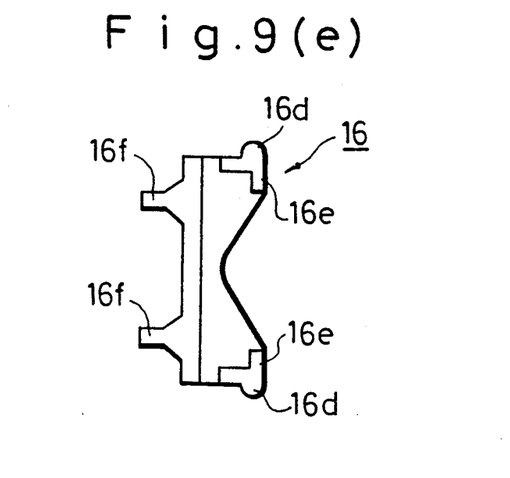

As shown in FIG. 8(a), this lane-change cam 9 is composed of: a groove 10 (neutral surface portion) having a V-shaped section and serving to retain the blinker operation lever 4 in its neutral position; step sections 11 and 12 formed on the inclined surfaces defined by this groove 10 and adapted to effect engagement or create a clicking feeling when performing a lane change; and raised sections 13 and 14 respectively situated outside these step sections 11 and 12 with respect to the groove 10.

Figure 7:
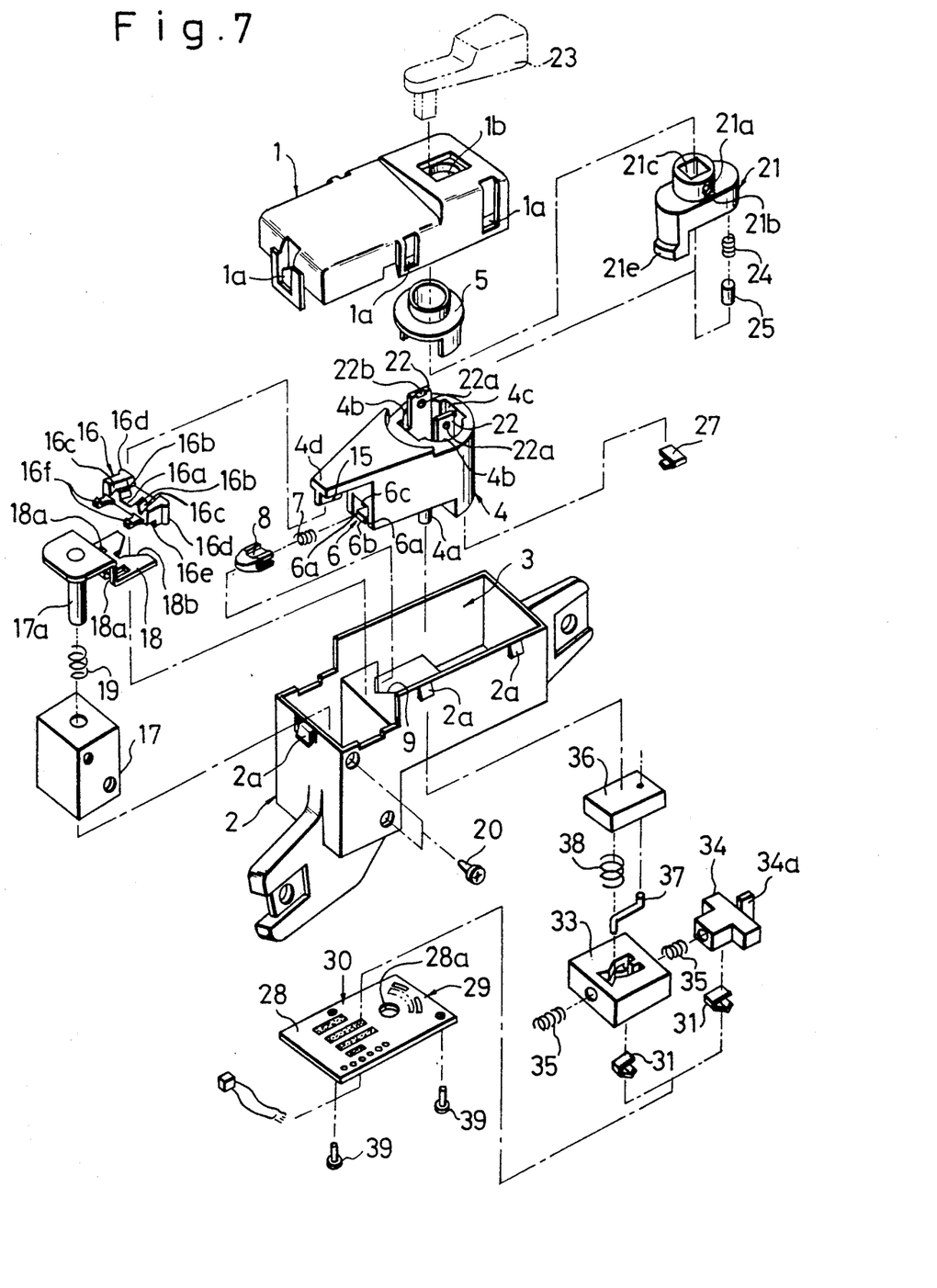
FIG. 7 is an exploded perspective of this automatic cancelling device for blinkers.

A plate section 4d extends from the above-mentioned free end section of the blinker operation lever 4, and a fin section 15 (second cam follower) protrudes from the inner surface (the surface on the side of the driving rod 8) of this plate section 4d, extending in the direction in which the driving rod 8 moves (that is, toward the axis defined by swinging axles 4a and 5). A locking member 16 is arranged in such a manner as to make a touching and separating motion with respect to this fin section 15. As shown in FIGS. 9(a) to 9(e), this locking member 16 includes a recess 16a which is formed in the middle of one of its surfaces and whose depth is such that the bottom thereof does not abut against the fin section 15, protrusions 16b respectively formed on each side of the recess 16a, and V-shaped locking grooves 16c adapted to engage the fin section 15 of the lever 4 so as to retain it in its right or left position. The protrusions 16b and the locking grooves 16c are radially arranged with respect to the swinging axis of the blinker operation lever 4. Respectively provided on either end surface of the locking member 16 are guide protrusions 16d adapted to respectively fit into guide grooves 2c formed on the inner side surface of the case 2. Further, an engagement member 16e extends downwards (as seen in FIG. 7) from one side surface of the locking member 16, and a pair of locking pawls 16c extend from another side surface of the same.

Figure 1A:
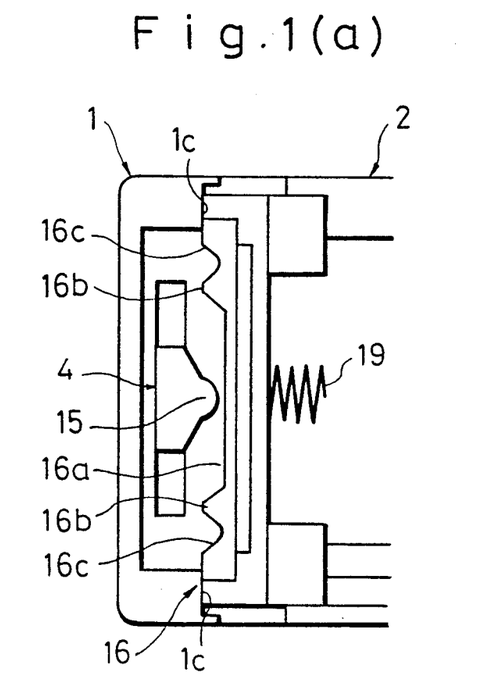
FIGS. 1(a), 1(b) and 1(c) are diagrams illustrating an automatic cancelling device for blinkers in accordance with an embodiment of this invention in its neutral position, the lane changing position, and its left position, respectively.

This locking member 16 is integrally snapped onto an attachment plate 18 fixed to the tip of the operating shaft 17a of a solenoid 17. This attachment plate 18 is bent downwards and is then bent again to exhibit a surface parallel to the upper surface thereof. Formed along these bent portions are engagement slits 18a adapted to engage the above-mentioned locking pawls 16f. Further, a V-shaped notch 18b is formed in the middle of the forward end section of the attachment plate 18. The above-mentioned engagement member 16e of the locking member 16 abuts against that end surface of the attachment plate 18 including the notch 18b, and, at the same time, the locking pawls 16f are inserted into the engagement slits 18a of the attachment plate 18. A compression spring 19 is fitted onto the above-mentioned operating shaft 17a, biasing the operating shaft 17a, the attachment plate 18, and the locking member 16 in such a manner that they are inclined to move away from the solenoid 17. When the solenoid 17 is energized, this operating shaft 17a is drawn into the solenoid against the resilient force of the compression spring 19. When the solenoid is not being energized, the edge sections of the locking member 16 respectively abut, as shown in FIG. 1(a), against step sections 1c of the cover 1, thereby controlling the stroke of the operating shaft 18a and preventing it from coming off. By energizing this solenoid 17 so as to cause the operating shaft 17a to be drawn into it, the engagement between the fin section 15 of the blinker operation lever 4 and either of the locking grooves 16c of the locking member 16 is cancelled. This solenoid 17 is lodged in the lodging section 3 and is fastened to the case 2 by means of a screw 20.

Further, provided on the blinker operation lever 4 is a passing lever 21 whose swinging axis is perpendicular to that of the blinker operation lever 4. In order to enable this passing lever 21 to be attached to the blinker operation lever 4, a pair of plate-like support shafts 22 respectively extend in the vertical direction through the arc-like fitting recesses 4b respectively provided on each side of the above-mentioned through-hole 4c. These support shafts 22 have bearing holes 22a, into which pins 21a of the passing lever 21 are respectively inserted. These support shafts are formed long enough to provide a certain degree of resiliency. When attaching the passing lever 21 to the blinker operation lever 4, the support shafts 22 can be outwardly bent by the pins 21a of the passing lever 21, thus allowing the pins 21a to fit into the bearing holes 22a. The support shafts 22 then move inwardly back to their original position by their own resiliency, with the result that the passing lever 21 is swingably supported by the support shafts 22. The reference numeral 22b indicates arched guides for facilitating the attachment of the passing lever 21.

Figure 4:
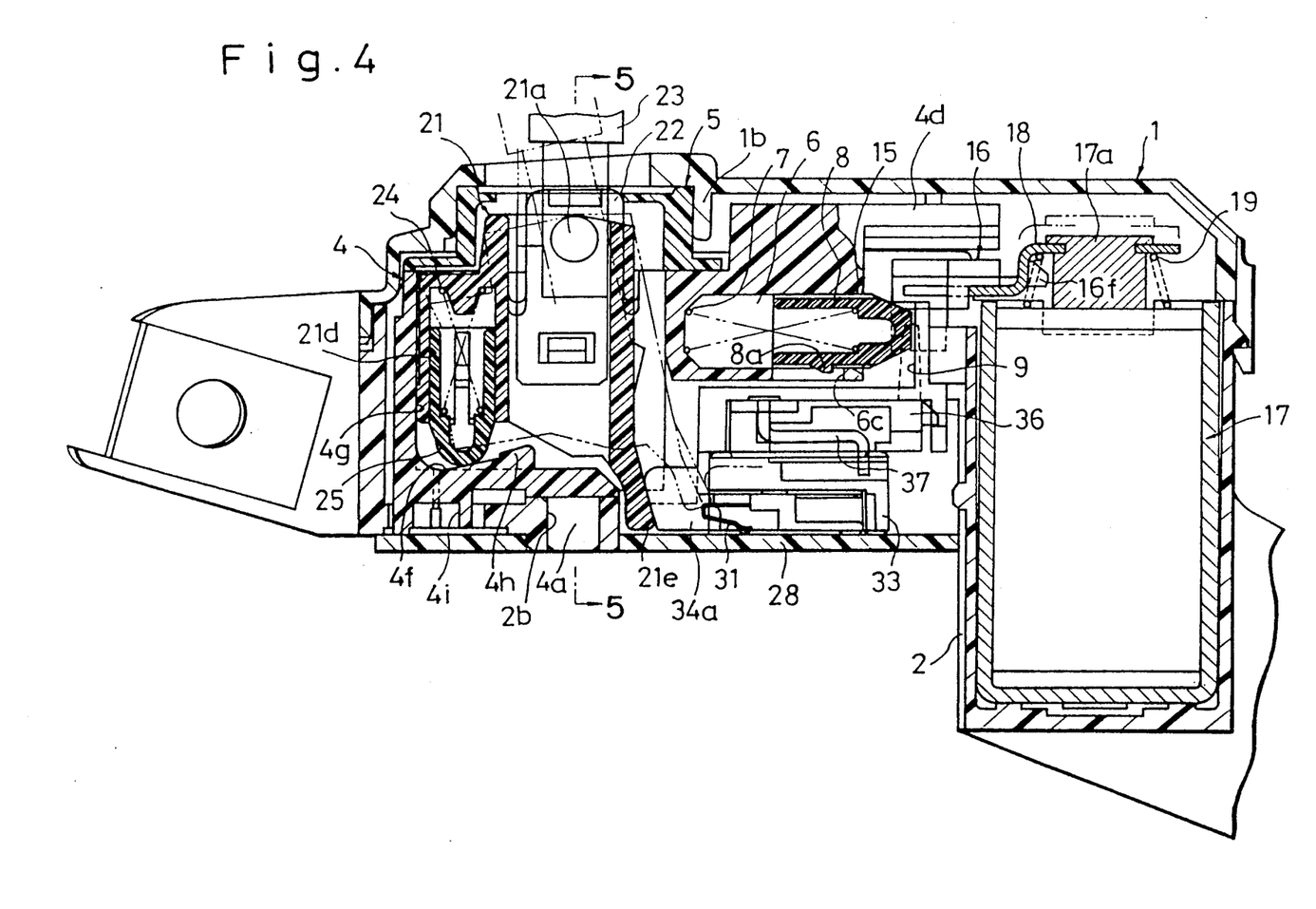
FIG. 4 is a longitudinal sectional view of this automatic cancelling device for blinkers.
Figure 5:
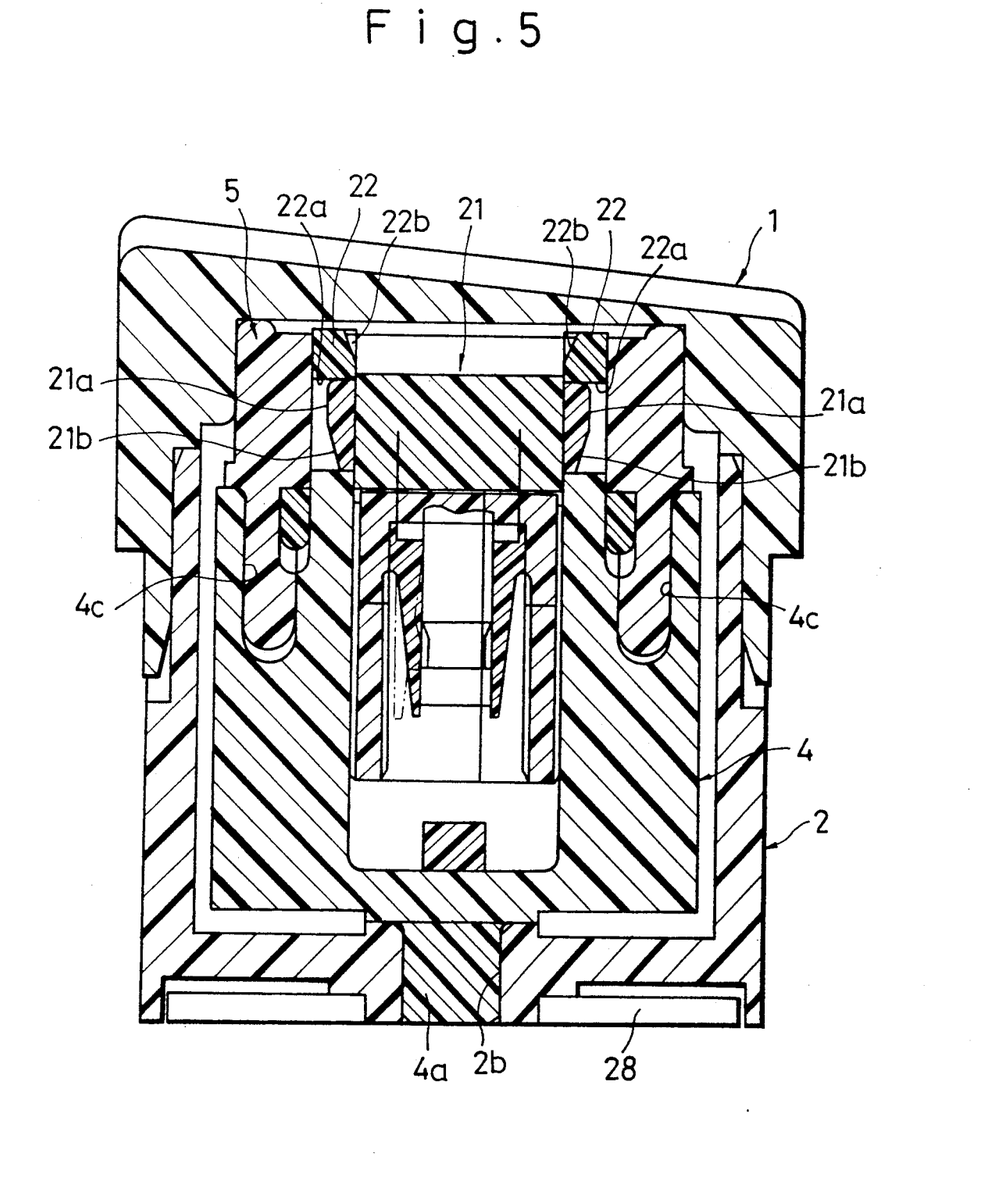
FIG. 5 is a sectional view taken along the line 5—5 of FIG. 4.
Figure 6:
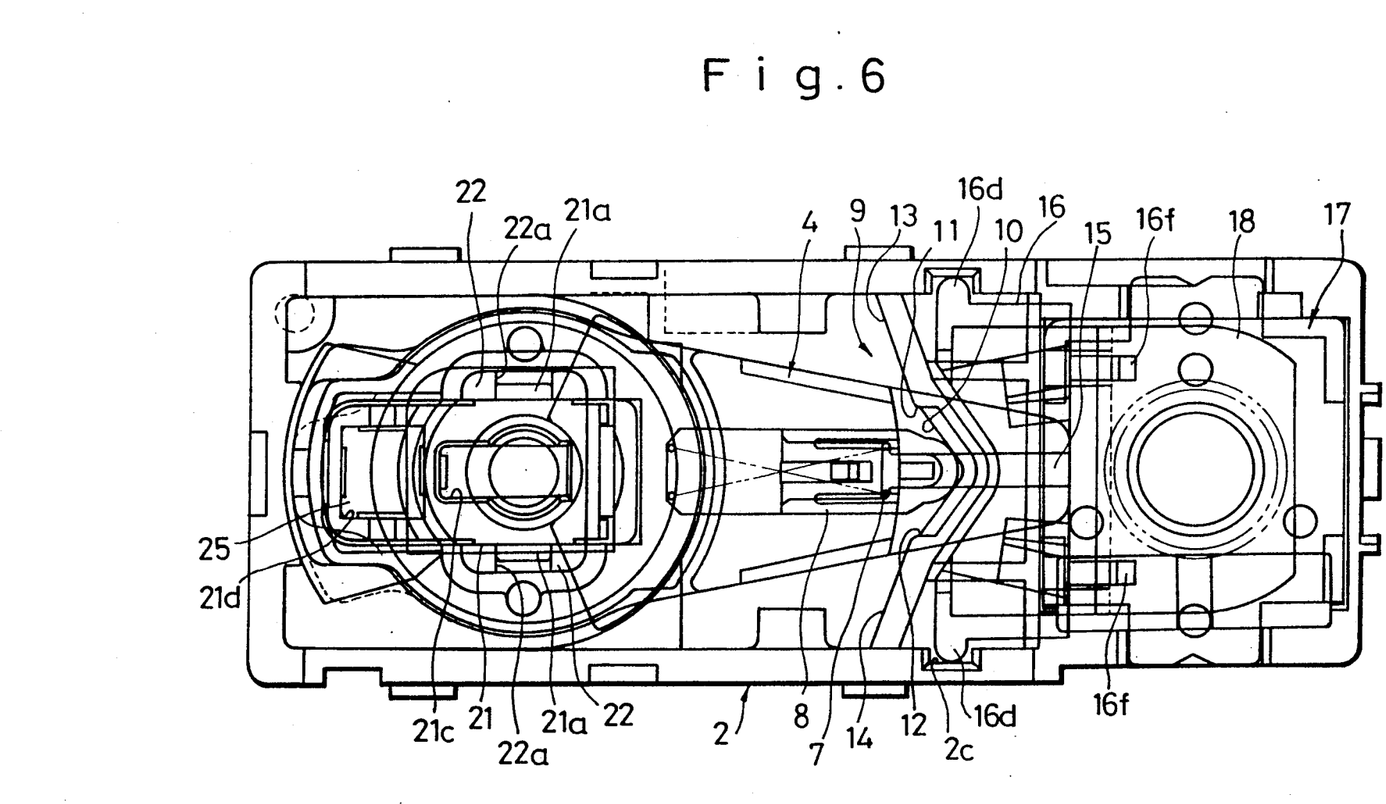
FIG. 6 is a plan view of the device with its cover removed.
Figure 10A:
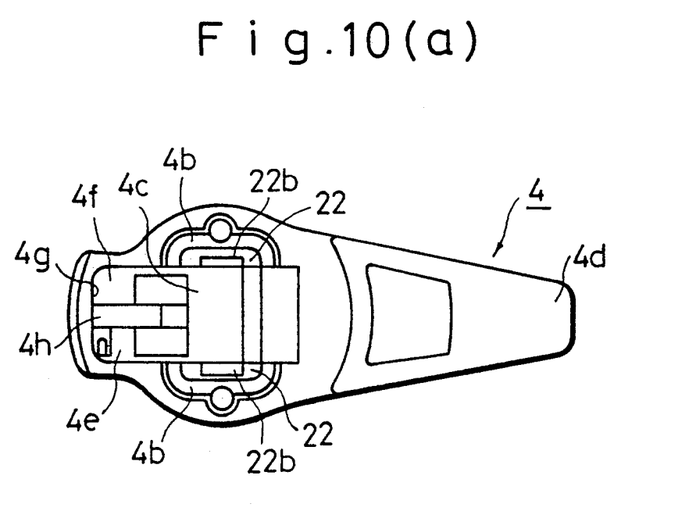
FIGS. 10(a), 10(b), 10(c) and 10(d) are a plan view, a front view, a bottom view, and a right-hand side view, respectively, of the blinker operation lever.
Figure 10B:
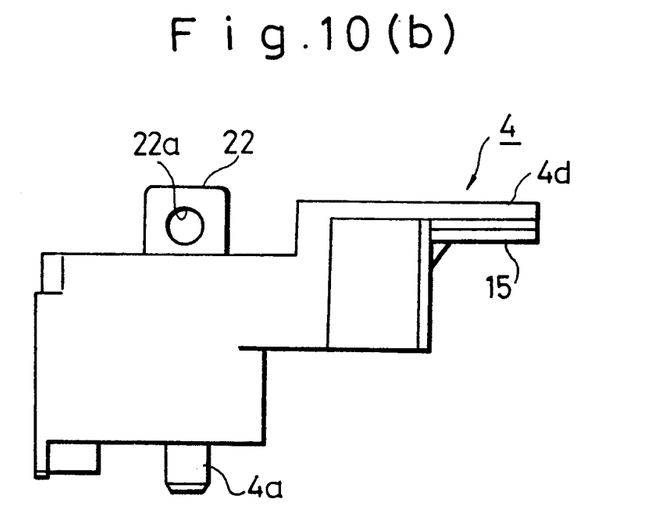
Figure 10C:
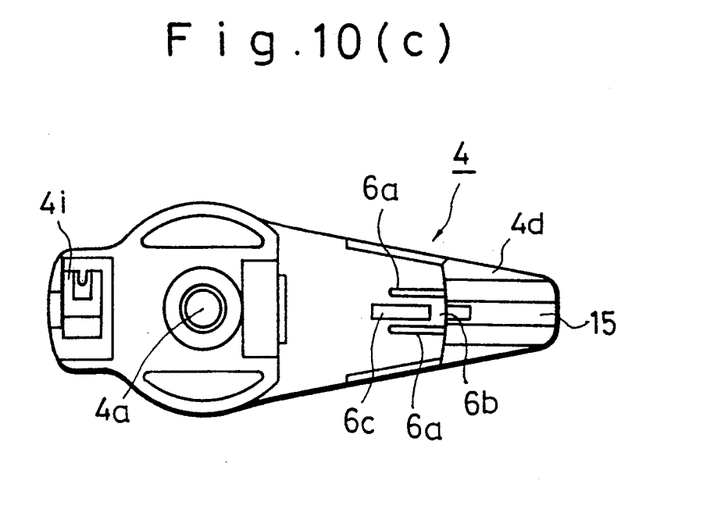
Figure 10D:
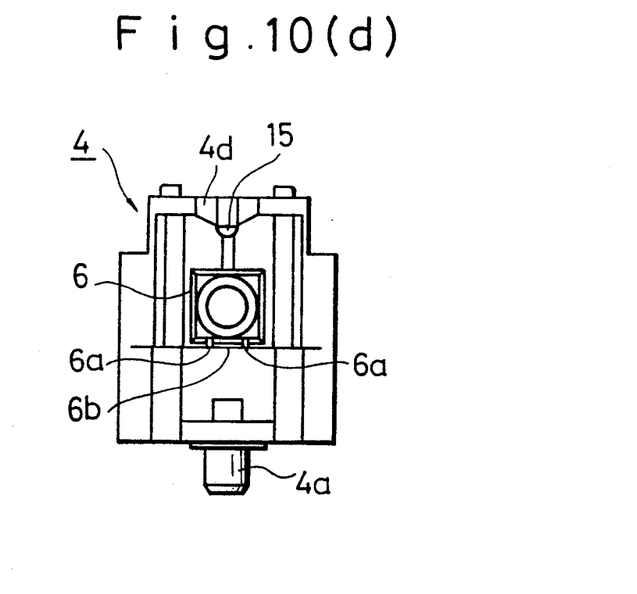

Formed on the top surface of this passing lever 21 is an attachment hole 21c, into which an operation knob 23 is to be fitted. This attachment hole 21c is situated at a position corresponding to the bearing hole 1b of the cover 1, so that it is exposed to the exterior. Thus, the operation knob 23, situated outside, is integrally attached to the passing lever 21, which can be swung by manipulating the operation knob 23. The manipulation of the operation knob 23 also enables the blinker operation lever 4 to be swung. Further, formed on the lower surface of the passing lever 21 is a lodging hole 21d, into which a driving rod 25 is swingably inserted through the intermediation of a coil spring 24. The tip of this driving rod 25 is pressed against the inner bottom surface 4f of a transverse hole section 4e communicating with the through-hole 4c of the blinker operation lever 4. The passing lever 21 is biased clockwise (as seen in FIG. 4) around the pins 21a by the compressed coil spring 24, and a side surface of the passing lever 21 abuts against an inner side surface 4g (FIG. 10(a)) of the above-mentioned transverse hole 4e so as to control the rotation of the passing lever 21. Further, an operating member 21e for operating a dimmer switch 26 protrudes downwards from one free end of the passing lever 21. The reference numeral 4h indicates a cam section adapted to create a clicking feeling during the passing operation.

Further, formed on the lower surface of the other free end of the blinker operation lever 4 is a recess 4i, in which a moving contact 27 is lodged. This moving contact 27 is adapted to slide over right/left blinker switching contacts 29 provided on a base plate 28 attached to the inner bottom surface of the case 2. Further, formed on the base plate 28 are dimmer and passing contacts 30, which constitute the above-mentioned dimmer switch 26. This dimmer switch 26 is composed of: a moving contact 31 adapted to slide over the dimmer and passing contacts 30; a first slider 33 adapted to lodge the moving contact 31 in its bottom recess and having on its upper surface a heart cam 32; a second slider 34 adapted to lodge the above-mentioned moving contact 31 in its bottom recess and having a bearer section 34a against which the operating member 21e of the passing lever 21 abuts; coil springs 35 respectively arranged on each end in the sliding direction of the first slider 33; a crank pin 37 one end of which is inserted into the heart cam 32 and the other end of which is fitted into a support plate 36; and a press spring 38 for pressing one end of the crank pin 37 against the heart cam 32. Accordingly, when the passing lever 21 is rotated against the resilient force of the coil spring 24, the bearer section 34a of the second slider 34 of the dimmer switch 26 is pressed by the operating member 21e, causing the first slider 33 to slide. This causes the moving contact 31 of the first and second sliders 33 and 34 to slide over the dimmer and passing contacts 30, thereby turning ON and OFF the dimmer or the passing operation.

The reference numeral 28a indicates a through-hole formed in the base plate 28, and the reference numeral 39 indicates a screw, which is used for fastening the base plate 28 to the bottom surface of the case 2.

Next, the operation of this embodiment, constructed as described above, will be explained.

Figures 2A, 2B:
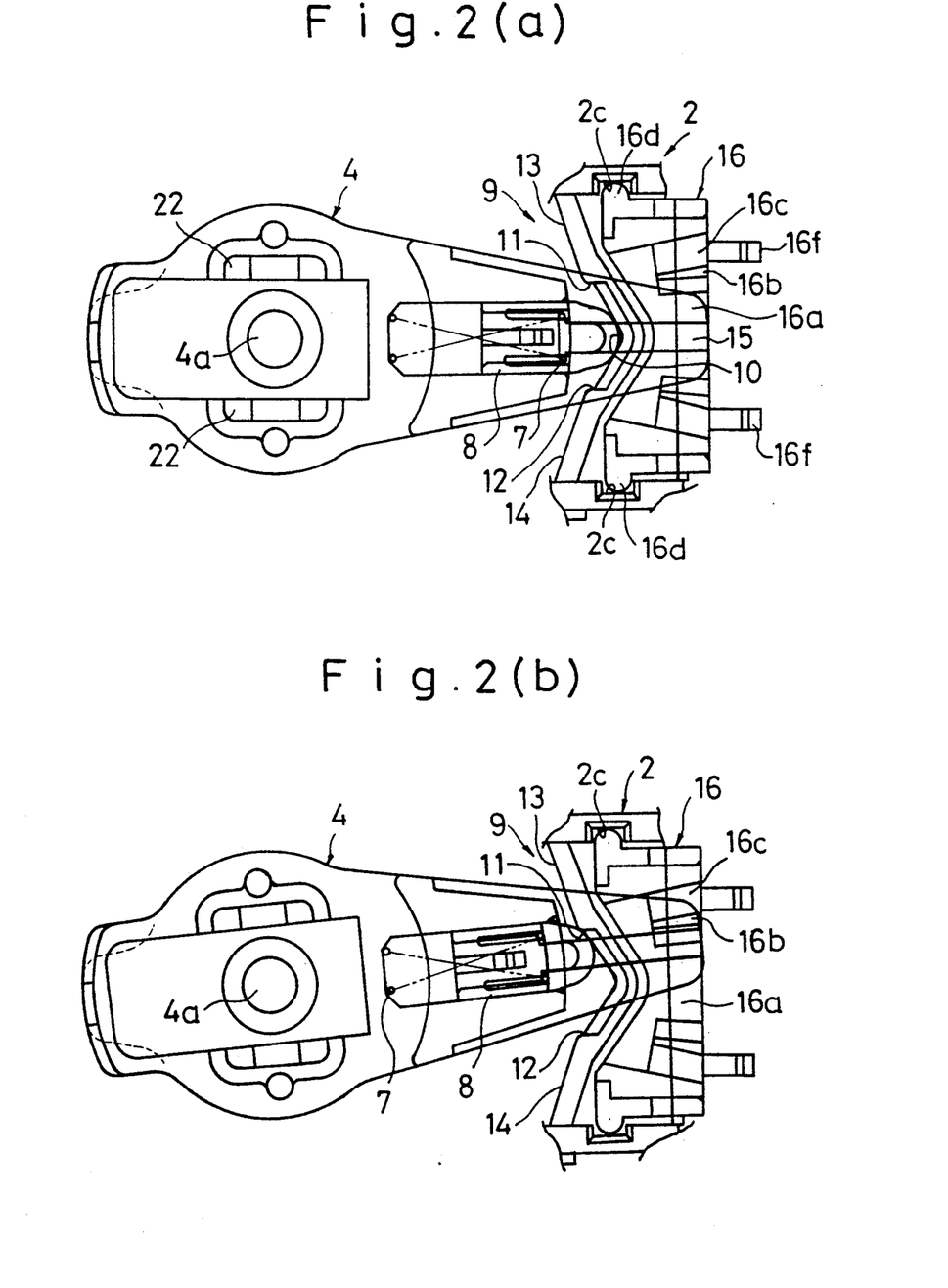
FIGS. 2(a), 2(b) and 2(c) are diagrams illustrating, in correspondence with FIGS. 1(a), 1(b) and 1(c), different positions of the blinker operation lever and the lane-change cam.
Figure 3A:
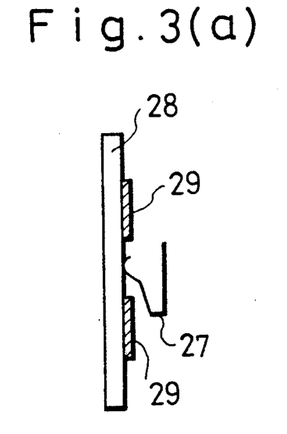
FIGS. 3(a), 3(b) and 3(c) are diagrams illustrating, in correspondence with FIGS. 1(a), 1(b) and 1(c), different positions of the blinker switching contacts and the moving contact.

In the neutral position, which is shown in FIG. 2(a), the driving rod 8 of the blinker operation lever 4 is pressed against the V-shaped groove 10 of the lane-change cam 9 by the compression spring 7, and is thereby held in this position. FIG. 1(a) shows the fin section 15 and the locking member 16 in the position corresponding to that shown in FIG. 2(a). As shown in FIG. 1(a), the compression spring 19 causes the locking member 16 to abut against the stopper steps 1c of the cover 1. In this condition, the fin section 15 of the blinker operation lever 4 is positioned in the middle of the locking member 16, i.e., in the middle of the recess 16a, without being in contact with the bottom surface of the recess 16a. FIG. 3(a) shows the condition of the right and left blinker contacts when they are in the neutral position shown in FIGS. 1(a) and 2(a). The moving contact 27 of the blinker operation lever 4 is between the ON contacts of the right/left blinker switching contacts 29, with neither the right nor the left blinker flashing.

Figure 1B:
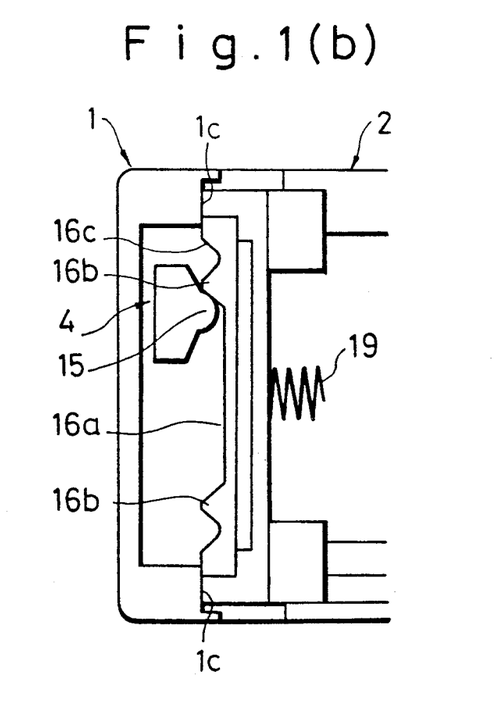
Figure 1C:
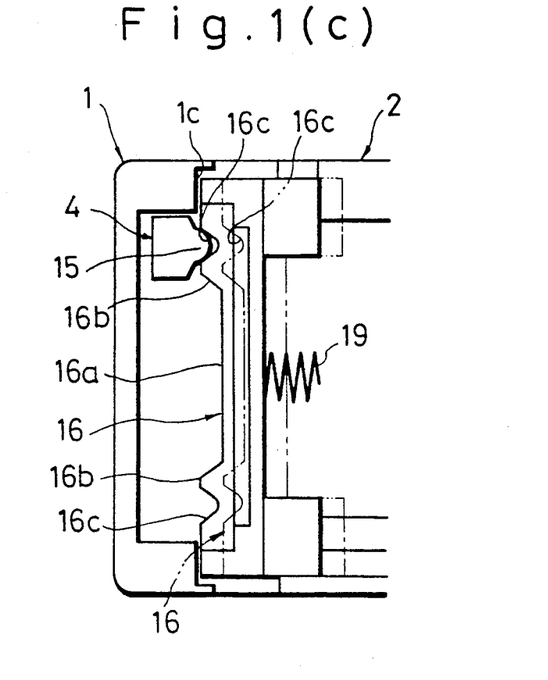
Figure 2C:
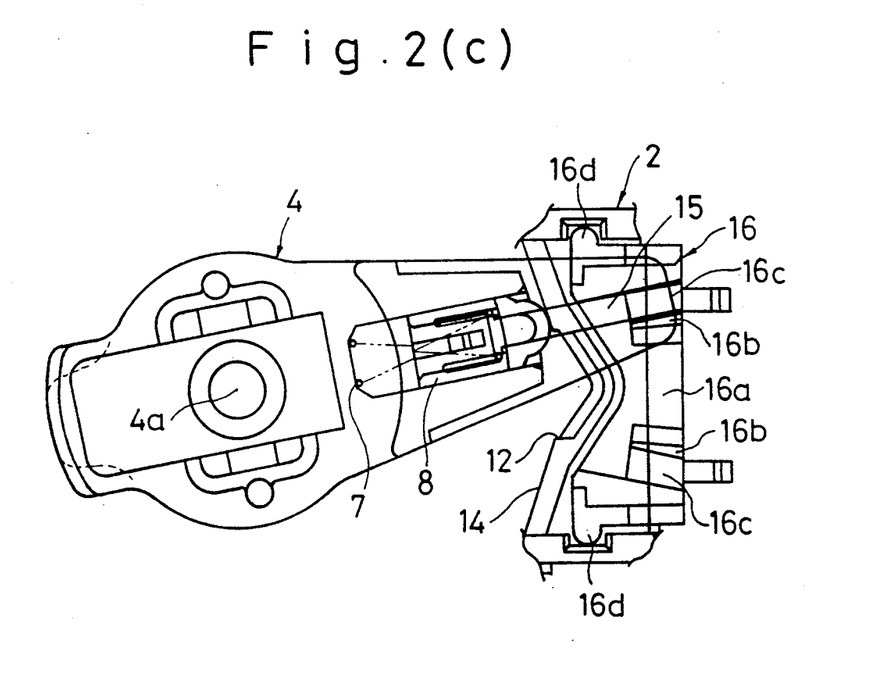
Figure 3B:
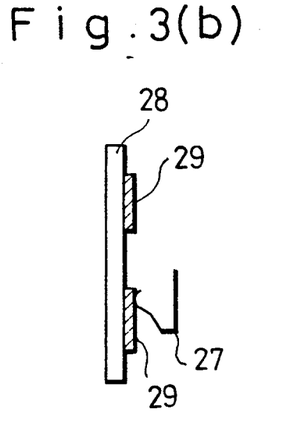
Figure 3C:
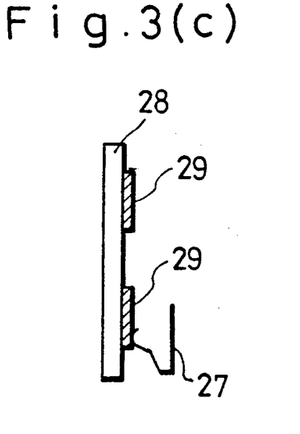

When causing, for example, the left blinker to flash, the operation knob 23 is manipulated so as to rotate the blinker operation lever 4 counterclockwise (as seen in FIG. 2(a)) from the position shown in FIGS. 1(a) and 2(a). This causes the driving rod 8 to slide on the lane-change cam 9 while compressing the compression spring 7 by the lane-change cam 9 and creates a clicking feeling when moving over the step section 11 (or 12) as shown in FIG. 2(b), with the driving rod 8 being positioned on the raised section 13 (or 14) as shown in FIG. 2(c). In this condition, shown in FIG. 2(c), the blinker operation lever 4 is locked. This locking, however, is not effected by the above-mentioned lane-exchange cam 9 and the driving rod 8 but by the engagement between the fin section 15 and the locking member 16. That is, when, in the condition shown in FIG. 2(b), the blinker operation lever 4 is rotated counterclockwise as stated above, the fin section 15 abuts, as shown in FIG. 1(b), against the protrusion 16b and causes the locking member 16 to move to the right against the resilient force of the compression spring 19. Then, as shown in FIG. 1(c), the fin section 15 fits into the locking groove 16c, thereby locking the blinker operation lever 4 in the position shown in FIGS. 1(c) and 2(c). This locking is effected by making the pressing force of the compression spring 19 for pressing the locking member 16 against the fin section 15 larger than the returning force produced by causing the driving rod 8 to be pressed against the lane-change cam 9 by means of the compression spring 7. When effecting locking, the locking member 16 is separated from the stopper step sections 1c so that a predetermined level of pressing force may act on the fin section 15. In the condition shown in FIGS. 1(c) and 2(c), the moving contact 27 is, as shown in FIG. 3(c), brought to the left-blinker-ON position of the right/left blinker switching contacts 29, thereby causing the left blinker to flash.

Next, the blinker cancelling operation will be described. When the solenoid 17 is energized by a cancelling signal produced, for example, by turning the steering wheel back to the steady position, the operating shaft 17a (in FIG. 4) is drawn downwards into the solenoid 17 against the force of the compression spring 19, thereby moving the attachment plate 18 and the locking member 16, which are integrally attached to this shaft 17a, downwards. That is, energization of the solenoid 17 in the condition shown in FIG. 1(c) causes the locking member 16 to move to the right against the force of the compression spring 19, bringing it to the position indicated by the chain line of FIG. 1(c). This causes the fin section 15 and the locking member 16 to be separated from each other to cancel the locking, so that the blinker operation lever 4 is rotated by the above-mentioned returning force to its neutral position shown in FIGS. 1(a) and 2(a) and is retained there. In this way, the flashing of the left blinker is cancelled.

Next, the lane changing operation will be described. In this case, the blinker operation lever 4 is rotated to cause the driving rod 8 to abut against the step section 11 or 12 of the lane-change cam 9, with the fin section 15 not reaching the locking groove 16c. That is, the blinker operation lever 4 is rotated to the position shown in FIGS. 1(b) and 2(b). When the blinker operation lever 4 has been thus rotated, the moving contact 27 is, as shown in FIG. 3(b), connected to one of the right/left blinker switching contacts 29, causing the left (or right) blinker to flash. If, however, the operating force applied to the blinker operation lever 4 is cancelled, the blinker operation lever 4 is immediately rotated from the position shown in FIGS. 1(a) and 2(a) to the neutral position by the above-mentioned returning force, and are brought back to the position shown in FIGS. 1(a) and 2(a).

Thus, in this embodiment, constructed as described above, the lane-change cam 9 and the locking member 16 are formed as separate members, so that the locking member 16 can be moved by the solenoid irrespective of the resilient force of the compression spring 7 acting on the lane-change cam 9. Accordingly, the driving force for the solenoid 17 may be relatively small, which enables the solenoid 17 to be produced in a small size and at low cost.

Further, the displacement of the locking member 16 can be diminished since it does not depend on the configuration of the lane-change cam 9.

In addition, since more freedom is available in terms of the configuration of the lane-change cam, the operator can experience a varied feeling in operation.

As described above, this invention enables the driving force for the cancelling movement to be diminished, thereby making it possible to reduce the size and the production cost of the driving member and to provide an automatic cancelling device for blinkers capable of creating a varied feeling in operation.

What is claimed is:
1. A switch device comprising:
   a case (2);
   an operation lever (4) pivotally mounted in said case (2) about an axis (4a);
   a first cam surface (9) fixedly disposed in said case (2) and defining a neutral surface portion (10);
   a first cam follower (8) slidably mounted on said operation lever (4) and biased in a radial direction from said axis (4a) to contact said first cam surface (9) such that said operation lever (4) is biased to pivot about said axis (4a) to be disposed in a neutral position wherein said first cam follower (8) contacts said neutral surface portion (10);
   a second cam follower (15) fixedly disposed on said operation lever (4);
   a second cam surface (16) movably disposed in said case (2) adjacent said second cam follower (15), said second cam surface (16) biased in a direction parallel to said axis (4a) and toward said second cam follower (15), said second cam surface (16) having a surface defining a recess (16a) and a locking groove (16c), said surface being disposed relative to said second cam follower (15) such that when said operation lever (4) is pivoted from said neutral position, said second cam follower (15) is moved from a point adjacent said recess (16a) to abut said locking groove (16c); and
   a solenoid (17) fixedly connected to said case (2) and contacting said second cam surface (16) such that when said solenoid (17) is activated, said second cam surface (16) is moved away from said second cam follower (15).

* * * * *